United States Patent
Brannon et al.

(10) Patent No.: US 7,528,096 B2
(45) Date of Patent: May 5, 2009

(54) STRUCTURED COMPOSITE COMPOSITIONS FOR TREATMENT OF SUBTERRANEAN WELLS

(75) Inventors: Harold Dean Brannon, Magnolia, TX (US); Allan Ray Rickards, Tomball, TX (US); Phillip B. Kaufman, Conroe, TX (US)

(73) Assignee: BJ Services Company, Houston, TX (US)

( * ) Notice: Subject to any disclaimer, the term of this patent is extended or adjusted under 35 U.S.C. 154(b) by 322 days.

(21) Appl. No.: 11/430,296

(22) Filed: May 8, 2006

(65) Prior Publication Data

US 2006/0258546 A1   Nov. 16, 2006

Related U.S. Application Data

(60) Provisional application No. 60/680,199, filed on May 12, 2005.

(51) Int. Cl.
*C09K 8/74* (2006.01)
*C09K 8/62* (2006.01)

(52) U.S. Cl. .................. 507/269; 427/372.2; 427/212; 428/404; 428/407; 428/403; 166/295; 166/292; 175/72

(58) Field of Classification Search .................. 507/269
See application file for complete search history.

(56) References Cited

U.S. PATENT DOCUMENTS

| | | | |
|---|---|---|---|
| 4,894,285 A | 1/1990 | Fitzgibbob et al. | |
| 4,935,474 A | 6/1990 | Ewen et al. | |
| 5,518,996 A | 5/1996 | Maroy et al. | |
| 5,531,274 A | 7/1996 | Bienvenu, Jr. | |
| 6,059,034 A | 5/2000 | Rickards et al. | |
| 6,153,562 A | 11/2000 | Villar et al. | |
| 6,279,656 B1 | 8/2001 | Sinclair et al. | |
| 6,312,515 B1 | 11/2001 | Barlet-Gouedard et al. | |
| 6,330,916 B1 | 12/2001 | Rickards et al. | |
| 6,364,018 B1 | 4/2002 | Brannon et al. | |
| 6,458,198 B1 | 10/2002 | Baret et al. | |
| 6,508,305 B1 | 1/2003 | Brannon et al. | |
| 6,582,819 B2 | 6/2003 | McDaniel et al. | |
| 6,645,288 B1 | 11/2003 | Dargaud et al. | |
| 6,695,902 B2 | 2/2004 | Hemmings et al. | |
| 7,210,528 B1 | 5/2007 | Brannon et al. | |
| 7,284,611 B2 * | 10/2007 | Reddy et al. | 166/295 |
| 7,322,411 B2 | 1/2008 | Brannon et al. | |
| 2002/0048676 A1 | 4/2002 | McDaniel et al. | |
| 2004/0023812 A1 | 2/2004 | England et al. | |
| 2004/0040708 A1 | 3/2004 | Stephenson et al. | |
| 2004/0138339 A1 | 7/2004 | Freeman et al. | |
| 2005/0000690 A1 | 1/2005 | Boney | |
| 2005/0006093 A1 | 1/2005 | Nguyen | |
| 2005/0019574 A1 | 1/2005 | McCrary | |
| 2005/0028979 A1 | 2/2005 | Brannon et al. | |
| 2006/0047027 A1 | 3/2006 | Brannon et al. | |
| 2006/0065398 A1 | 3/2006 | Brannon et al. | |
| 2006/0073980 A1 | 4/2006 | Brannon et al. | |
| 2006/0078682 A1 * | 4/2006 | McDaniel et al. | 427/372.2 |

FOREIGN PATENT DOCUMENTS

| | | |
|---|---|---|
| CA | 1251223 | 3/1989 |
| CA | 2302688 | 9/2005 |
| EP | 0621247 A2 | 10/1994 |
| EP | 0771935 | 7/1997 |
| WO | 2006034298 | 3/2006 |

OTHER PUBLICATIONS

"Best Practices in Glass Recycling", "Simple Particle Packing" by Clean Washington Center, Issue date / update: Nov. 1996.*
Boisnault, Jean Marc et al; "Concrete Developments in Cementing Technology;" Oilfield Review; Spring 1999; pp. 16-29.
Al-SUwaidi, Abdullah et al; "Light as a Feather, Hard as a Rock;" Oilfield Review; Summer 2001; pp. 2-15.

* cited by examiner

*Primary Examiner*—Timothy J Kugel
*Assistant Examiner*—Atnaf Admasu
(74) *Attorney, Agent, or Firm*—John Wilson Jones; Jones & Smith, LLP

(57) ABSTRACT

A structured composite is comprised of particulates having particle size distribution of at least two modes and a binder. The particle size distribution is preferably bi-modal or tri-modal. The composite may further contain a density-modifying agent for modifying the density of the composite. The particulates are preferably substantially spherical and may be ultra lightweight (ULW) materials. The resulting composites exhibit the requisite strength to survive downhole imposed stresses and temperatures.

85 Claims, 2 Drawing Sheets structured composite compositions for treatment of subterranean wells

This application claims the benefit of U.S. patent application Ser. No. 60/680,199, filed on May 12, 2005, which is herein incorporated by reference.

FIELD OF THE INVENTION

This invention relates to methods and compositions useful for subterranean formation treatments, such as hydraulic fracturing treatments and sand control. In particular, this invention relates to the use of structured composites comprised of particulates having a particle size distribution of at least two modes and the use of such composites in hydraulic fracturing and sand control methods, such as gravel packing, frac pack treatments, etc.

BACKGROUND OF THE INVENTION

Stimulation procedures often require the use of well treating materials having high compressive strength. In hydraulic fracturing, such materials must further be capable of enhancing the production of fluids and natural gas from low permeability formations. In a typical hydraulic fracturing treatment, fracturing treatment fluid containing a solid proppant is injected into the wellbore at high pressures. Once natural reservoir pressures are exceeded, the fluid induces fractures in the formation and proppant is deposited in the fracture, where it remains after the treatment is completed. The proppant serves to hold the fracture open, thereby enhancing the ability of fluids to migrate from the formation to the wellbore through the fracture. Because fractured well productivity depends on the ability of a fracture to conduct fluids from a formation to a wellbore, fracture conductivity is an important parameter in determining the degree of success of a hydraulic fracturing treatment. Choosing a proppant is critical to the success of well stimulation.

Proppants used in the art include sand, glass beads, walnut hulls, and metal shot as well as resin-coated sands, intermediate strength ceramics, and sintered bauxite; each employed for their ability to cost effectively withstand the respective reservoir closure stress environment. The relative strength of these various materials increases with their corresponding apparent specific gravity (ASG), typically ranging from 2.65 for sands to 3.6 for sintered bauxite. Unfortunately, increasing ASG leads directly to increasing degree of difficulty with proppant transport and reduced propped fracture volume, thereby reducing fracture conductivity.

More recently, ultra lightweight (ULW) materials have been used as proppants since they reduce the fluid velocity required to maintain proppant transport within the fracture, which, in turn, provides for a greater amount of the created fracture area to be propped. Exemplary of such proppants are significantly lighter deformable particles. Such ULW proppants, like conventional heavier proppants, have the capability to effectively withstand reservoir closure stress environments while increasing fracture conductivity.

Aggregate compositions employing ULW proppants comprised of solid particulates encased within a polymeric coating or continuous phase have been reported. Further useful in many instances are glass bubbles encased within a ceramic continuous phase.

Materials of various specific gravities may be used as the particulates within the aggregate to achieve the desired particle specific gravity and downhole conditions. For example, successful deformable particles include modified ground walnut hulls which are capable of withstanding higher closure stress than walnut hulls in their natural state. Modified walnut hull based ULW proppants are manufactured by impregnating closely sized walnut particles (i.e. $20/30$ US mesh) with epoxy or other resins. These impregnated walnut hull particles are then coated with phenolic or other resins. Such walnut hull based ULW proppants have a bulk density of 0.85 grams/cc. Further exemplary of deformable particles are polystyrene divinylbenzene (PSDVB) deformable beads.

In addition to having low specific gravity, ULW proppants must also be of sufficient strength to withstand the rigors of high temperatures and high stresses downhole. ULW proppants, while offering excellent compressive strength, readily soften and loose their compressive strength especially at high temperature and high pressure conditions. For instance, resinous materials currently being utilized as ULW proppants have been observed to deform at elevated temperatures to the extent that under a 5,000 psi stress load at temperatures greater than 250° F., the permeability of the ULW proppant pack is deformed beyond the limits of its commercial utility even though the melting point of the resin is at a temperature of well greater than 300° F.

U.S. Pat. No. 6,582,819 discloses proppant composite composed of fillers (such as finely divided minerals, fibers, walnut shells, almond shells and coconut shells) bounded by a binder. Such composites, however, often are inadequate for downhole stresses and temperatures.

Thus, an improved composition of high particle strength at high temperature is needed for utilization in applications with high temperature and high pressure downhole conditions.

In particular, proppant composites are desired with significantly improved stress tolerance over the composites of the prior art.

SUMMARY OF THE INVENTION

The structured composites of the invention are relatively resistant to deformation and are especially useful for the treatment of subterranean wells. The composites are composed of (i) particulates having a particle size distribution of at least two modes; and (ii) a binder. The concentration of particulates in the composite is such that the particulates are bound by and/or within the binder.

The composites of the invention substantially improve productivity in petroleum and gas production and are especially useful for high temperature and high pressure downhole conditions. In particular, they provide for substantially improved overall system performance in hydraulic fracturing applications, as well as in other well treating applications such as sand control.

In a preferred embodiment, the particle size distribution of the particulates is bi-modal or tri-modal. The composites may further contain density-modifying agents.

The volume and median particle size of the multi-modal particulates are selected so as to generate a close-packed structure of particulates. Such close-packed particulates significantly reinforce the strength (or modulus) of the composite. Stresses are transmitted through the packed particulates in communication with one another. As such, composites demonstrate significantly improved stress tolerance, compared to composites of similar type compositions which are not multi-modal.

In addition, the composites of the invention exhibit sufficient internal structural strength to mitigate against deformability.

Selection of particulates, binder and, optional, density-modifying agent will depend upon a number of factors including the probable closure stress, formation temperature, and the type of formation fluid.

BRIEF DESCRIPTION OF THE DRAWINGS

In order to more fully understand the drawings referred to in the detailed description of the present invention, a brief description of each drawing is presented, in which.

DETAILED DESCRIPTION OF THE PREFERRED EMBODIMENTS

Figure 1:
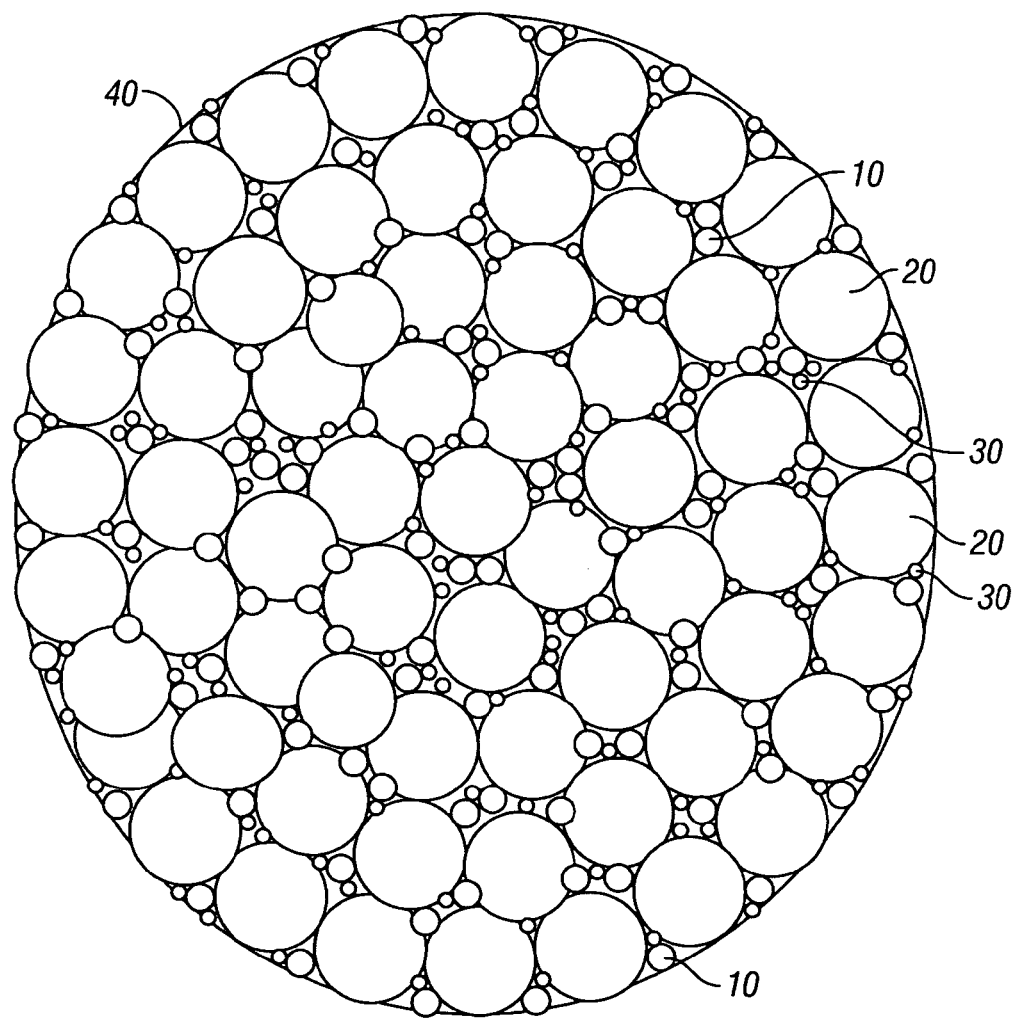
FIG. 1 is a drawing of a cross-section of a structured composite comprised of particulate materials having three modes of particle size in accordance with the invention.

The structured composites are characterized by particulates bound and/or surrounded by a binder. The particulates having a particle size distribution of at least two modes. The particulates may further be characterized as small, tightly sized, particles.

In a preferred mode, the particulates of the first (and principal) modality of particle size distribution are substantially spherical in order to promote packing orientations of the highest strength. The particulates of one or more of the other modalities may further be substantially spherical.

Further, the particulates are preferably substantially homogeneously distributed within the composite.

The particle size distribution and the chemical constituency of the particulates and binder are chosen to provide desired particle strength enhancements as well as flexibility in the apparent specific gravity (ASG) of the composite.

The median particle diameter of the particulates is such that $D_{50}$ of the particulates of the first modality is greater than the $D_{50}$ of the particulates of the second modality. The parameter $D_{50}$ is defined as the diameter for which 50% of the volume of particulates has the specified particle diameter. The $D_{50}$ of each successive mode is less than the $D_{50}$ of the immediate previous mode. For instance, the $D_{50}$ of the particulates of the third modality is generally less than the $D_{50}$ of the second modality; the $D_{50}$ of the particulates of the fourth modality would be less than the $D_{50}$ of the third modality, etc.

The particle size distribution of the particulates in the first modality is preferably as narrow as possible. Preferably, the particle size distribution, psd, of the first modality may be represented as $0.5 \times D_{50} \leq psd \leq 1.5 \times D_{50}$. Thus, for instance, where $D_{50}$ is 100μ, psd is greater than or equal to 50μ but less than or equal to 150μ. The $D_{50}$ of each of the other modalities may further be similarly defined by the same equation.

Generally, the $D_{50}$ of the particulates of a given modality is less than about 36%, preferably less than 30%, of the $D_{50}$ of the particulates of the previous modality. For instance, the $D_{50}$ of the particulates of the second modality is generally less than about 36%, preferably less than 30%, of the $D_{50}$ of the particulates of the first modality; the $D_{50}$ of the particulates of the third modality is generally less than about 36%, preferably less than 30%, of the $D_{50}$ of the particulates of the second modality, etc.

The $D_{50}$ of particulates of a mode (other than the first mode) is chosen such that the particulates will fit within the pore spaces of particulates of the next successive mode. For instance, the $D_{50}$ of particulates of a second modality may be chosen such that such particulates may fit within the particulates of the first mode.

The use of particulates having multi-modal particle size distributions improves the strength of the composite. Another attribute of particulates of multi-modal size distribution is their ability to be stirred or mixed at much lower resistance, thereby fostering a homogenous distribution. The morphology of the structured composite is determinative of the strength of the composite. In particular, the strength of the composite is attributable to the multi-modality of the particulates. The strength of the particulates is preferably such that the composition is suitable for use as a propping agent.

In general, the particulates of at least one mode of the composite of the invention are stress resistant. The stress tolerance of the structured composite of the invention is greater than the stress tolerance of a proppant composite of substantially similar composition of particulates having a particle size distribution which is substantially unimodal. For instance, the composites of the invention may be employed at temperatures approaching 300° F. at closure stresses greater than 5,000 psi. In a preferred embodiment, the particulates of the composition exhibit a crush resistance under conditions as high as 15,000 psi closure stress, API RP 56.

The total volume of the particulates forming the structured composite of the invention is generally greater than 65% of the volume of the structured composite.

The distribution of the particulates in the first mode, based on cumulative particulate volume, prior to the addition of the binder, is generally between from about 40 to about 75 volume percent, preferably from about 55 to about 70 volume percent. As an example where the particulates are spherical, the volume of particulates in the first mode, based on cumulative particulate volume exhibiting bi-modal particulate distribution, is approximately 73% of the cumulative particulate volume. For a composite with tri-modal particulate distribution, the theoretical volume of particulates in the first mode, based on cumulative particulate volume, is approximately 66.4% of the cumulative particulate volume. For a composite with tetra-modal particulate distribution, the volume of particulates in the first mode is approximately 64% of the cumulative particulate volume. The volume of particulates in a given modality may display a slight deviation in those instances where the particulates are not perfectly spherical.

The amount of particulates having a particle size distribution in the second modality in the composite is between from about 10 and to about 30%, preferably from about 15 to about 30%. When present, the amount of particulates having a particle size distribution in a third modality is between from about 1 and to about 20%. The amount of particulates in each succeeding modality is less than the amount in the immediate preceding modality.

FIG. 1 illustrates a composite with particulates of tri-modal particle size distribution. As illustrated, the particulates of the second modality 10 are chosen such that they fit within the interstices, or pore spaces, created by the particulates of the first modality 20. The $D_{50}$ of the particulates of the third modality 30 are chosen such that such particulates may fit within the interstitial spaces created by the first and/or second modalities, etc. Generally, the $D_{50}$ of particulates of the second mode are generally at least one order of magnitude smaller in diameter than the diameter of the particulates of the first modality. The $D_{50}$ of each successive mode is generally at least one order of magnitude smaller in diameter than the $D_{50}$ of the predecessor mode. The particulates of each successive modality enhance the strength of the composite and reduce the particle volume fraction occupied by the binder.

As an example, where the composite contains bi-modal particulates, the $D_{50}$ of the first mode may generally be between from about 1μ to about 200 microns. The $D_{50}$ of particulates of the second mode is generally between from about 0.1μ to about 30μ.

Where the composite contains tri-modal particulates, the $D_{50}$ of the first mode may be between from about 10μ to about 200 microns, the $D_{50}$ of particulates of the second mode may be between from about 1μ to about 30μ and the $D_{50}$ of particulates of the third mode may be between from about 0.1μ to about 10μ.

The ASG of particulates within a single mode of modality may be the same or different. Particulates within different modalities may have the same or different ASG. Typically, the ASG of the particulates is between from about 0.5 to about 3.6. The bulk density of the composite is generally between from about 0.50 to 1.50 g/cc.

The composition of the particulates within a single modality may be the same or different. Further, the composition of particulates in different modalities may be the same or different. For instance, the composition of the particulates of the second modality may be the same or different from the composition of the particulates of the first modality. The composition of the particulates of a third modality may be the same or different from the composition of the particulates of either or both of the first or second modalities, etc.

The composition of the particulates of the first mode should be selected to provide the desired particle strength. The greater the strength of the particulates of the first mode, the greater the strength of the composite. The composite is of sufficient strength to survive the downhole imposed stresses and temperatures.

Suitable particulates include minerals, fly ash, glass bubbles, kaolin, cement, sand, inorganic salts, sand, silica, fumed silica, mica, talc, zirconia, carbon black, carbon Buckminster fullerenes, carbon nano-tubes, polyhedral oligomeric silsesquioxane, clays, ceramic spheres, metals, metallic oxides, metallic salts, a modified naturally occurring material, crushed nut shells, ground or crushed seed shells, ground or crushed fruit pits, processed wood, and organic polymeric materials.

In a preferred mode, at least one modality of the particulates is composed of relatively lightweight particulates having an ASG less than or equal to 2.45. Such particulates shall include ultra lightweight (ULW) density particulates having an ASG less than or equal to 2.35, preferably less than or equal to 1.25, more preferably less than or equal to 1.0.

Included within such ULW particulates are glass bubbles or microspheres; modified naturally occurring materials; porous particulates treated with a non-porous penetrating, coating and/or glazing material; as well as aggregates of an organic lightweight material and a weight modifying agent wherein the ASG of the organic lightweight material is either greater or less than the ASG of the aggregate. Such ULW particulates are disclosed in U.S. Patent Application Publication 20050028979, herein incorporated by reference. In a preferred embodiment, the ULW particulates are microspheres, or a ceramic or an organic polymeric material.

Generally, between from about 5% to about 35% by volume of the composite is the binder. The binder may be an organic or inorganic binder. The binder may further be a combination of at least one organic material and at least one inorganic material.

Typical organic binders are those selected from resole or novolac resins, such as phenolic resole or novolac resins, epoxy-modified novolac resins, epoxy resins, polyurethane resins, alkaline modified phenolic resoles curable with an ester, melamine resins, urea-aldehyde resins, urea-phenol-aldehyde resins, furans, synthetic rubbers, silanes, siloxanes, polyisocyanates, polyepoxys, polymethylmethacrylates, methyl celluloses, crosslink entangled polystyrene divinylbenzenes, polyesters, polyamides, polyimides, polyethylenes, polypropylenes, polystyrenes, polyolefins, polyvinyl alcohols, polyvinylacetates, silyl-modified polyamides and, optionally, a crosslinking agent.

Typical inorganic binders include silicates, e.g., sodium silicate, aluminosilicates, phosphates, e.g., polyphosphate glass, borates, or mixtures thereof, e.g., silicate and phosphate.

The composite may further contain a density-modifying agent. Typically, between from about 60 to about 85 volume percent of the composite may be the density-modifying agent. The density-modifying agent may be present, in combination with the particulates, in any or all of the modalities. Selection of the volume proportions of density-modifying agent and binder may be selected so as to control flexural resistance strength. Typically, the particles of the density-modifying agent range in size from about 1 to about 100 μm.

Suitable density-modifying agents include silicates, phosphates, borates, fly ash, glass, glass microspheres, ceramic microspheres, aluminosilicates, silica (quartz sand), alumina, mica, kaolin, hematite, calcium carbonate, calcium chloride, calcium bromide, barium sulfate, an alkali metal salt, talc, zirconia and trimanganese tetraoxide. Further, the density-modifying agent may contain a cation selected from the group consisting of an alkali metal, alkaline earth metal, ammonium, manganese, and zinc and an anion selected from the group consisting of a halide, an oxide, a carbonate, nitrate, sulfate, acetate, and formate.

Further, the density-modifying agents may be a finely divided mineral or finely divided mineral and fiber, bound by a suitable organic or inorganic binder. Finely divided minerals include fly ash, silica (quartz sand), silica flour, alumina, mica, silicate, e.g., orthosilicates or metasilicates, aluminum silicate, calcium silicate, kaolin, talc, zirconia, boron and glass, e.g., glass microspheres. Fibers include at least one member selected from the group consisting of milled glass fibers, milled ceramic fibers, milled carbon fibers, polymeric fibers or coated fibers, and synthetic fibers.

It may also be desirable to include a bonding additive with the binder to further enhance structural strengths. The use of organofunctional silanes, such as delta-aminopropyltriethoxy silane, is especially preferred as bonding additive. The combination of binder and binding additive may contain up to 25 volume percent of binding additive.

The particulates of a given modality are preferably substantially spherical and exhibit sphericity of at least 0.7, preferably at least 0.85, and most preferably at least 0.90, API RP56, Section 5.

To strengthen the composite, a protective or hardened surface coating may be coated onto the core of the multi-modal particulates and binder set forth at 40 in FIG. 1. The surface coating is either pre-cured or is curable. Alternatively, the surface coating may constitute a mixture of pre-cured and curable coatings. The surface coating may be curable by exposure to elevated temperature and/or compressive stress. In a preferred embodiment, the surface coating is an organic polymeric material, a glazing material, a cementitious material, or a ceramic material such as liquid and/or curable resins, plastics, cements, sealants, or binders such as a phenol, phenol formaldehyde, melamine formaldehyde, urethane, epoxy resin, nylon, polyethylene, polystyrene or combination thereof. In a preferred mode, the surface coating is an ethyl carbamate-based resin. Examples of glaze-forming materials include, but are not limited to, materials such as magnesium oxide-based material, boric acid/boric oxide-based material, etc.

In a preferred mode, between from about 55% to about 70% by volume of the composite comprises particulates of a first modality having an ASG of less than about 3.6, preferably less than about 3.0, and a $D_{50}$ greater than about 30 microns; from about between 10% to about 30% by volume of the composite particulates of a second modality having an ASG less than 3.6 and a median particle size of less than about 30 microns, preferably less than about 20 microns; and, optionally, from about between 1% to about 20% by volume of the composite particulates of a third modality having an ASG less than about 5.0, preferably less than about 3.6 and a median particle size of less than about 10 microns; and greater than about 5% by volume of a binder.

Further, in a preferred mode, the composite is an ultra lightweight structured proppant composite comprising between from about 55% to about 70% by volume of the composite particulates of a first modality having an ASG less than about 1.0 and a $D_{50}$ of greater than 50 microns; from about 20% to about 30% by volume of the composite particulates of a second modality having an ASG less than 2.75 and a median particle size of less than 15 microns; optionally, from about 1% to about 20% by volume of the composite particulates of a third modality having an ASG less than 3.2 and a median particle size of less than 5 microns; and greater than 5% by volume of a binder.

In a preferred embodiment, at least a portion of the composite is nano-particulates. The median particle size of the composite is generally from about 100 mesh to about 8 mesh.

The composite of the invention may be introduced into the wellbore as a slurry with a carrier fluid. At least a portion of the composite may be substantially neutrally buoyant in the carrier fluid. In a preferred mode, the composite has an ASG which is substantially buoyant to that of the ASG of the carrier fluid.

The composites of the invention are resistant to deformation and thus have particular applicability in the treatment of subterranean wells. In a preferred embodiment, the composite is introduced into the formation to hydraulically induce a fracture in the formation. The composites of the invention further find particular applicability in sand control methods, including gravel packing, etc. Preferably, the composite is suspended in the treatment fluid prior to being pumped into the subterranean zone.

The structured composite may be prepared by mixing a stirrable slurry containing the multi-modal particulates and binder to form a pelletizable mixture. The pelletizable mixture may then be processed to form structured composite pellets. Such pellets are then hardened by heating the structured component pellets, preferably to a temperature between from about 25° C. to about 1400° C. The hardened structured composite pellets are then screened to the desired size. The process for preparing the composite may include at least one step selected from the group consisting of extrusion, granulation, molding, fluidized bed processing, drying, cooling, solvent evolution, heat treating, firing, and/or sintering.

Unlike proppants characterized by angular particulates which may bridge at orifices and block flow, the proppant composites of the invention are free-flowing, i.e., they are capable of flowing without bridging.

EXAMPLES

The following examples will illustrate the practice of the present invention in its preferred embodiments. Specific gravity is expressed in g/cc.

Example 1

The following composition results in an ultra lightweight proppant particle composite having a specific gravity of 1.28. The composite contains 10.7 volume percent (of composite) of phenolic resin binder having a specific gravity of 0.85. The particulates have a trimodal particle size distribution as set forth in Table I:

TABLE I

| Component | $D_{50}$ | Volume % Composite | Volume % Particulates | Specific Gravity |
|---|---|---|---|---|
| glass bubbles (10,000 psi) | 30μ | 60.0 | 67.2 | 0.63 |
| silica flour | 5μ | 21.6 | 24.2 | 2.65 |
| aluminum silicate | 0.8μ | 7.7 | 8.6 | 3.16 |

The particulates of the example exhibit resistance to closure stresses up to about 10,000 psi at bottom hole static temperatures (BHST) below the melting point of the resin. Manipulation of the compositions with alternative ASG components result in ultra lightweight proppant particles of widely varying ASGs. For example, replacement of the silica flour in the preceding example with hematite results in a particle having an ASG of about 1.84. Alternatively, replacing the aluminum silicate with hematite produces a particle with an ASG of 1.64.

Example 2

A composite was prepared by mixing (i.) 17.5 volume percent of ceramic microspheres having a $D_{50}$ of 4.8μ and a specific gravity of 2.4, commercially available as Zeeospheres™ spheres from 3M Corporation; (ii.) 17.5 volume percent of hollow glass spheres having a $D_{50}$ of 12.8μ and a specific gravity of 1.1, commercially available as Sphericel® 110P8 hollow glass spheres from Potters Industries, Inc.; and 65 volume percent of ceramic microspheres having a $D_{50}$ of 155.1μ and a specific gravity of 0.85.

Particle size analysis of the composite was performed on a Beckman Coulter LS PSA, using the Fraunhofer optical model, a dry powder module, a run length of 30 seconds and an obscuration of 6%. The particle size ranges of the three modalities are set forth in Table II:

TABLE II

| Particle Ranges, μ | % Volume | $D_{50}$ |
|---|---|---|
| 0.400-1.997 | 6.28 | 0.877 |
| 1.997-85.1 | 26.8 | 9.75 |
| 85.1-249.6 | 67.1 | 151.7 |

Figure 2:
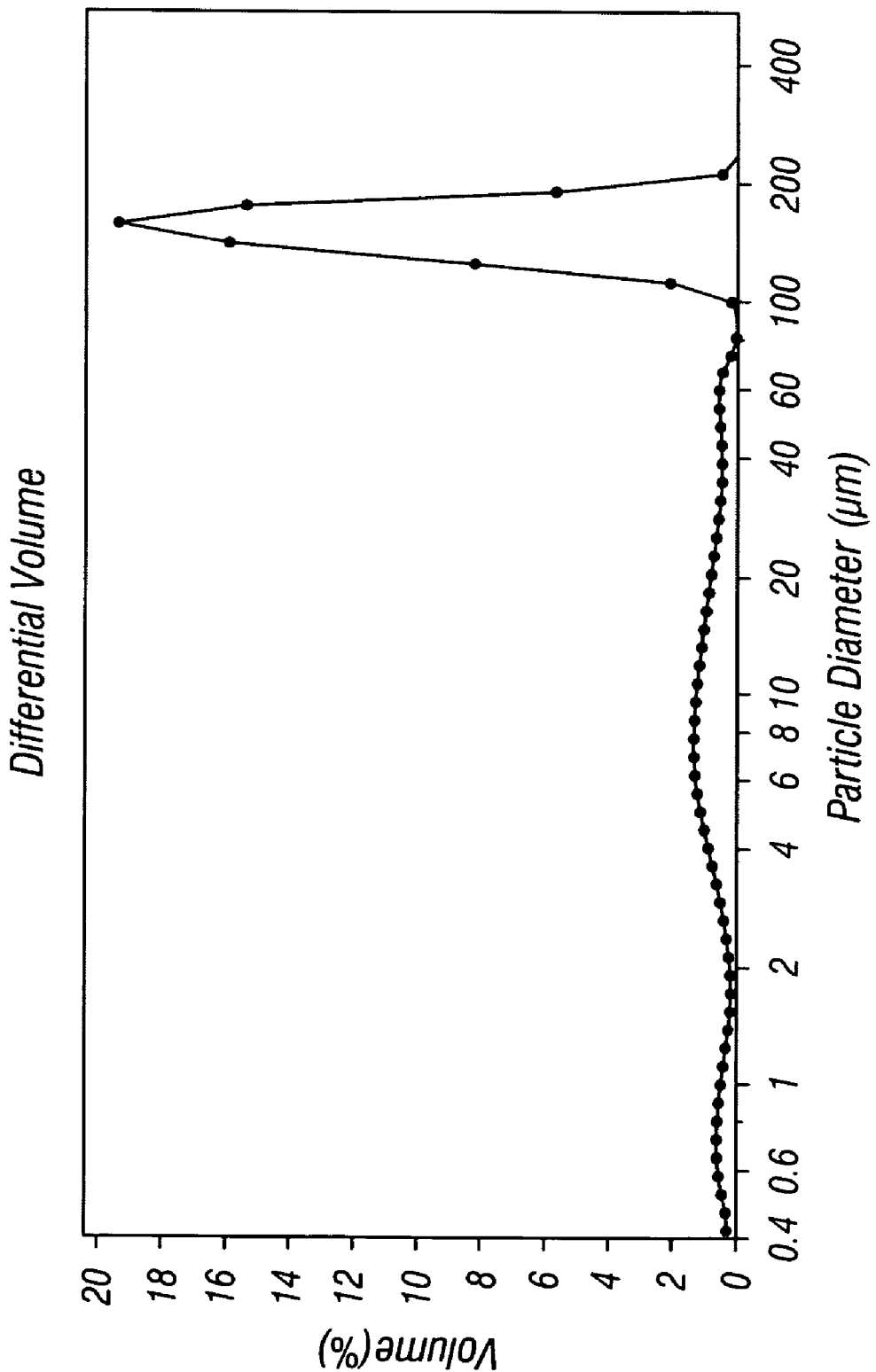
FIG. 2 is a graph illustrating three modes of particle size in accordance with the invention.

FIG. 2 is a graph showing frequency versus particle size of the multi-modal particulate composite. The first modality is the largest peak on the right; these particulates are characterized by the largest $D_{50}$ and are present in the largest frequency. The second modality has an intermediate size and frequency. The third modality is characterized by the smallest frequency and size.

Example 3

A composite mixture was prepared from the microspheres in Example 2 by adding 15 ml of distilled water to 35 ml of the ceramic hollow spheres having a $D_{50}$ of 155.1 µ. The mixture was stirred with a spatula and exhibited the consistency of wet sand such that the spatula was able to stand upright in the mixture. Next, 8 ml of Sphericel® 110P8 hollow glass spheres was stirred into the mixture. The resulting mixture became less viscous, even to the point of being flowable. The spatula was not able to stand upright. Then, 8 ml of the Zeeospheres™ were added. No noticeable change in viscosity was observed. The example illustrates the displacement of water by the components of the multi-modal composite and is indicative of the closely packed arrangement of the particulates in the composite.

Example 4

Structure composite pellets were formed by adding to an Eirich Mixer, manufactured by Eirich Machines, Inc., (i.) 1 gallon of glass bubbles having a $D_{50}$ of 30µ, commercially available as Scotchlite® 18000 from 3M Corporation, as a first mode; (ii.) 1 quart of hollow glass spheres having a $D_{50}$ of 8µ, commercially available as Sphericel® 110P8 hollow glass spheres from Potters Industries, Inc., as a second mode; and (iii) 1 quart of ceramic microspheres having a $D_{50}$ of 3µ, commercially available as Zeeospheres™ W210 spheres from 3M Corporation, as a third mode. The components were blended until homogeneous at a low table speed. The speed of the impacting impeller (having a rotation opposite to that of the table) was about 50 m/sec. While the mixture was being stirred, about 1 quart of a phenolic resin binder was slowly added until pellets were formed. The pellets were then removed from the Eirich Mixer and heat treated to 300° F. for 4 hours to ensure that the resin was fully cured.

The resulting pellets, having a specific gravity of 1.1, exhibited crush resistance of 11% under conditions of high stress, API RP 56, at conditions of 4 kpsi closure stress.

Other embodiments within the scope of the claims herein will be apparent to one skilled in the art from consideration of the specification and practice of the invention as disclosed herein. It is intended that the specification, together with the example, be considered exemplary only, with the scope and spirit of the invention being indicated by the claims which follow.

What is claimed is:

1. A deformation resistant, stress tolerant structured composite of substantially spherical multi-modal packed particulates useful for treating subterranean wells comprising:
   (i) particulates having a particle size distribution of at least two modes wherein the median particle diameter of the particulates of the first mode is at least 50% greater than the median particle diameter of the particulates of the second mode and wherein the particulates of the first mode are substantially homogeneously distributed within the composite; and
   (ii) a binder wherein the volume and median particle size of the multi-modal particulates generate a close-packed structure of particulates which reinforces the strength of the composite.

2. The composite of claim 1, wherein the particulates of at least one mode include ultra lightweight (ULW) particulates.

3. The composite of claim 2, wherein the ULW particulates are selected from the group consisting of:
   (a) glass bubbles;
   (b) modified naturally occurring materials;
   (c) porous particulates treated with a non-porous penetrating, coating and/or glazing material, and
   (d) an aggregate of an organic lightweight material and a weight modifying agent wherein the ASG of the organic lightweight material is either greater or less than the ASG of the aggregate.

4. The composite of claim 2, wherein the ULW particulates are a ceramic or organic polymeric material.

5. A proppant comprising the composite of claim 1.

6. The composite of claim 5, wherein the composite is an ultra lightweight structured composite.

7. The composite of claim 1, wherein the particulates have a particle size distribution of at least three modes.

8. The composite of claim 1, wherein the total volume of particulates is greater than 65% of the volume of the composite.

9. The composite of claim 1, wherein the ASG of the composite is less than 2.45.

10. The composite of claim 9, wherein the ASG of the composite is less than 1.25.

11. The composite of claim 10, wherein the ASG of the composite is less than 1.0.

12. A sand control particulate comprising at least one composite of claim 1.

13. A deformation resistant, stress tolerant structured composite of substantially spherical multi-modal packed particulates useful for treating subterranean wells comprising:
   (i.) particulates having a particle size distribution of at least two modes wherein the median particle diameter of particulates of the a first mode is from about 1µ to about 200 µ, and the median particle diameter of particulates of a second mode is from about 0.1µ to about 30µ and wherein the articulates of the first mode are substantially homogeneously distributed within the composite; and
   (ii.) a binder
   wherein the volume and median particle size of the multi-modal particulates generate a close-packed structure of particulates which reinforces the strength of the composite.

14. The composite of claim 13, wherein the particle size distribution of the particulates is at least three modes.

15. The composite of claim 14, wherein the median particle diameter of the particulates of the first mode is from about 10µ to about 200 µ, the median particle diameter of particulates of a second mode is from about 1µ to about 30µ and the median particle diameter of particulates of a third mode is between from about 0.1µ to about 10µ.

16. The composite of claim 14, wherein the median particle diameter of particulates of a second mode is such that the particulates will fit within the pore spaces of particulates of a first mode and further wherein the median particle diameter of particulates of a third mode is such that the particulates will fit within the pore spaces of particulates of the second mode.

17. The composite of claim 14, wherein the amount of particulates having a particle size distribution in a first mode is between from about 40 to about 75 volume percent, the amount of particulates having a particle size distribution in a second mode is between from about 15 to about 30 volume percent and the amount of particulates having a particle size distribution in a third mode is between from about 3 to about 10 volume percent.

18. The composite of claim 13, wherein the particulates of at least one mode include ultra lightweight (ULW) particulates.

19. The composite of claim 18, wherein the ULW particulates are selected from the group consisting of:
(a) glass bubbles;
(b) modified naturally occurring materials;
(c) porous particulates treated with a non-porous penetrating, coating and/or glazing material; and
(d) an aggregate of an organic lightweight material and a weight modifying agent wherein the ASG of the organic lightweight material is either greater or less than the ASG of the aggregate.

20. The composite of claim 13, wherein the total volume of particulates is greater than 65% of the volume of the composite.

21. The composite of claim 13, wherein the composition of particulates within the first mode and/or second mode are the same.

22. The composite of claim 13, wherein the particulates within the first mode and/or the second mode are of the same apparent specific gravity (ASG).

23. The composite of claim 13, wherein the median particle diameter of particulates of the second mode is such that the particulates fit within the pore spaces of particulates of the first mode.

24. The composite of claim 13, wherein the particulates are selected from the group consisting of ceramics, minerals, fly ash, glass bubbles, kaolin, cement, sand, inorganic salts, sand, silica, fumed silica, mica, talc, zirconia, carbon black, carbon Buckminster fullerenes, carbon nano-tubes, polyhedral oligomeric silsesquioxane, clays, ceramic spheres, metals, metallic oxides, metallic salts, a modified naturally occurring material, crushed nut shells, ground or crushed seed shells, ground or crushed fruit pits, processed wood and organic polymeric materials.

25. The composite of claim 13, wherein the particulates are at least partially surrounded by at least one layer of a protective or hardening coating.

26. The composite of claim 13, wherein at least a portion of the particulates comprise a density-modifying agent.

27. The composite of claim 13, wherein the ASG of the composite is less than 2.45.

28. The composite of claim 27, wherein the ASG of the composite is less than 1.25.

29. The composite of claim 28, wherein the ASG of the composite is less than 1.0.

30. The composite of claim 13, wherein the amount of articulates having a particle size distribution in the first mode is between from about 40 to about 75 volume percent.

31. The composite of claim 30, wherein the amount of particulates having a particle size distribution in the second modality mode is between from about 15 to about 30 volume percent.

32. The composite of claim 13, wherein the ASG of the particulates is between from about 0.35 to about 3.50.

33. A deformation resistant, stress tolerant structured composite of substantially spherical multi-modal packed particulates useful for treating subterranean wells comprising:
(i.) particulates having a particle size distribution of at least two modes wherein the median particle diameter of particulates of one mode is such that the particulates fit within the pore spaces of particulates of a second mode of particulates and further wherein the particulates of the second mode are substantially homogeneously distributed within the composite; and
(ii.) a binder wherein the volume and median particle diameter of the particulates of the at least two modes generate a close-packed structure of particulates which reinforces the strength of the composite.

34. The composite of claim 33, wherein the median particle size ($D_{50}$) of particulates of a the second mode is no greater than 36% of the particulates of the first mode.

35. The composite of claim 33, wherein the composition of the particulates of the multi-modal packed particulates are different.

36. The composite of claim 33, wherein the composition of particulates within a single mode are the same.

37. The composite of claim 33, wherein the particulates within a single mode are of the same apparent specific gravity (ASG).

38. The composite of claim 37, wherein the particulates within different modes have different ASG.

39. The composite of claim 33, wherein the particulates are selected from the group consisting of minerals, fly ash, glass bubbles, kaolin, cement, sand, inorganic salts, sand, silica, fumed silica, mica, talc, zirconia, carbon black, carbon Buckminster fullerenes, carbon nano-tubes, polyhedral oligomeric silsesquioxane, clays, ceramic spheres, metals, metallic oxides, metallic salts, a modified naturally occurring material, crushed nut shells, ground or crushed seed shells, ground or crushed fruit pits, processed wood, and organic polymeric materials.

40. The composite of claim 33, wherein the particulates are at least partially surrounded by at least one layer of a protective or hardening coating.

41. The composite of claim 40, wherein the coating is either pre-cured or is curable, or a mixture thereof.

42. The composite of claim 40, wherein the coating is at least one member selected from the group consisting of an organic polymeric material, a glazing material, a cementitious material or a ceramic material.

43. The composite of claim 41, wherein the coating is curable by exposure to elevated temperature and/or compressive stress.

44. The composite of claim 33, wherein the particulates exhibit crush resistance under conditions as high as 15,000 psi closure stress, API RP 56.

45. The composite of claim 33, wherein at least a portion of the particulates comprise a density-modifying agent.

46. The composite of claim 45, wherein 60 to 85 volume percent of the composite is the density-modifying agent.

47. The composite of claim 45, wherein at least a portion of the density-modifying agent is selected from the group consisting of silicates, phosphates, borates, fly ash, glass, glass microspheres, ceramic microspheres, aluminosilicates, silica (quartz sand), alumina, mica, kaolin, hematite, calcium carbonate, calcium chloride, calcium bromide, barium sulfate, an alkali metal salt, talc, zirconia and trimanganese tetraoxide.

48. The composite of claim 45, wherein at least a portion of the density-modifying agent contains a cation selected from the group consisting of an alkali metal, alkaline earth metal, ammonium, manganese, and zinc and an anion selected from the group consisting of a halide, an oxide, a carbonate, nitrate, sulfate, acetate, and formate.

49. The composite particle of claim 33, wherein at least a portion of the particulates is nano-particulates.

50. The composite of claim 33, wherein at least a portion of the binder is selected from a group consisting of novolac resins, resole resins, epoxy resins, polyurethane resins, alkaline modified phenolic resoles curable with an ester, melamine resins, urea-aldehyde resins, urea-phenol-aldehyde resins, furans, synthetic rubbers, polyester resins, polyamides, polyimides, polyethylenes, polypropylenes, polystyrenes, polyolefins, polyvinyl alcohols, polyvinylacetates, silyl-modified polyamides, silanes, siloxanes, polyisocyanates, polyepoxys, polymethylmethacrylates, methyl celluloses, crosslink entangled polystyrene divinylbenzenes, and optionally, a crosslinking agent.

51. The composite of claim 33, wherein at least a portion of the binder is selected from the group consisting of inorganic materials.

52. The composite of claim 51, wherein at least a portion of the binder includes a silicate.

53. The composite of claim 33, wherein the binder is a combination of at least one organic material and at least one inorganic material.

54. The composite of claim 33, wherein the median particle size of the composite is from about 100 mesh to about 8 mesh.

55. The composite of claim 33 wherein the process for preparing the composite includes at least one step selected from the group consisting of extrusion, granulation, molding, fluidized bed processing, drying, cooling, solvent evolution, heat treating, firing, and/or sintering.

56. A slurry comprising the composite of claim 33.

57. The slurry of claim 56, wherein the composite has an ASG which is substantially buoyant to that of the ASG of the carrier fluid.

58. The method composite of claim 33, wherein the particulates of the composite are ultra lightweight.

59. The composite of claim 33, wherein the particulates of at least one mode include ultra lightweight (ULW) particulates.

60. The composite of claim 59, wherein the ULW particulates are selected from the group consisting of:
    (a) glass bubbles;
    (b) modified naturally occurring materials;
    (c) porous particulates treated with a non-porous penetrating, coating and/or glazing material; and
    (d) an aggregate of an organic lightweight material and a weight modifying agent wherein the ASG of the organic lightweight material is either greater or less than the ASG of the aggregate.

61. The composite of claim 33, wherein the structured composite is an ultra lightweight structured proppant composite.

62. The composite of claim 33, wherein the particulates have particle size distribution of at least three modes wherein the median particle diameter of particulates of a third mode fit within the pore spaces of the particulates of the second mode.

63. The composite of claim 33, wherein the ASG of the composite is less than 2.45.

64. The composite of claim 63, wherein the ASG of the composite is less than 1.25.

65. The composite of claim 64, wherein the ASG of the composite is less than 1.0.

66. The composite of claim 33, wherein the particle size distribution of the particulates is at least three modes.

67. A deformation resistant, structured composite useful for treating subterranean wells comprising:
    (i) particulates having a multi-modal particle size distribution, wherein
        (a) from between about 55% to about 70% by volume of the composite of particulates of a first modality having an ASG of less than 3.6 and a median particle size ($D_{50}$) greater than 30 microns;
        (b) from between about 10% to about 30% by volume of the composite particulates of a second modality having an ASG less than 3.6 and a median particle size of less than 30 microns; and,
        (c) optionally, from between about 1% to about 20% by volume of the composite particulates of a third modality having an ASG less than 3.6 and a median particle size of less than 10 microns; and,
    (ii.) greater than 5% by volume of a binder.

68. The composite of claim 67, wherein the particulates of the first modality have an ASG less than 3.0 and the particulates of the second modality have an ASG less than 3.6 and a median particle size less than 20 microns.

69. A deformation resistant, structured composite useful for treating subterranean wells comprising:
    (i) particulates having a multi-modal particle size distribution, wherein
        (a) between from about 55% to about 70% by volume of the composite particulates are of a first modality; and
        (b) between from about 10% to about 30% by volume of the composite of particulates are of a second modality having a median size of less than 30% of the median size of particulates of the first modality; and
        (c) optionally, between from about 1% to about 20% by volume of the composite particulates are of a third modality having a median particle size of less than 30% of the median size of the second modality; and
    (ii) between from about 5% to about 35% by volume of a binder.

70. A deformation resistant, structured composite useful for treating subterranean wells comprising:
    (i) particulates having a multi-modal particle size distribution, wherein
        (a) between from about 55% to about 70% by volume of the composite particulates are of a first modality having an ASG less than about 1.0 and a median particle size ($D_{50}$) of greater than 50 microns;
        (b) between from about 20% to about 30% by volume of the composite particulates are of a second modality having an ASG less than 2.75 and a median particle size of less than 15 microns; and
        (c) optionally, between from about 1% to about 20% by volume of the composite particulates are of a third modality having an ASG less than 3.2 and a median particle size of less than 5 microns; and
    (ii) greater than 5% by volume of a binder.

71. A method of treating a hydraulically induced fracture in a subterranean formation surrounding a wellbore, comprising introducing into the formation the composite of claim 1.

72. A method of treating a subterranean zone penetrated by a wellbore comprising a treatment fluid composite of claim 1, wherein the composite is suspended in the treatment fluid and pumped into the subterranean zone.

73. A structured proppant composite, comprising (i) substantially homogeneous formed particulates comprising density-modifying particulates exhibiting a bi- modal or multi-modal particle size distribution; and (ii) a binder, wherein the stress tolerance of the structured proppant composite is greater than the stress tolerance of a proppant composite of substantially similar composition having particulates having a particle size distribution which is substantially unimodal and further wherein the composite has a bulk density of between from about 0.50 to 1.50 g/cc.

74. A proppant comprising the composite of claim 13.

75. The composite of claim 74, wherein the structured composite is an ultra lightweight structured proppant composite.

76. A slurry comprising the composite of claim 13.

77. A sand control particulate comprising at least one composite of claim 13.

78. A method of treating a hydraulically induced fracture in a subterranean formation surrounding a wellbore, comprising introducing into the formation the composite of claim 13.

79. A method of treating a subterranean zone penetrated by a wellbore comprising a treatment fluid composite of claim 13, wherein the composite is suspended in the treatment fluid and pumped into the subterranean zone.

80. The method of claim 79, wherein the particulates of the composite are ultra lightweight.

81. A proppant comprising the composite of claim 33.

82. A sand control particulate comprising at least one composite of claim 33.

83. A method of treating a hydraulically induced fracture in a subterranean formation surrounding a wellbore, comprising introducing into the formation the composite of claim 33.

84. A method of treating a subterranean zone penetrated by a wellbore comprising a treatment fluid composite of claim 33, wherein the composite is suspended in the treatment fluid and pumped into the subterranean zone.

85. The method of claim 84, wherein the particulates of the composite are free-flowing.

\* \* \* \* \*

UNITED STATES PATENT AND TRADEMARK OFFICE
CERTIFICATE OF CORRECTION

PATENT NO. : 7,528,096 B2
APPLICATION NO. : 11/430296
DATED : May 5, 2009
INVENTOR(S) : Harold D. Brannon et al.

Page 1 of 1

It is certified that error appears in the above-identified patent and that said Letters Patent is hereby corrected as shown below:

Column 10, line 35, replace "of the a first" with "of a first"

Column 10, line 38, replace "articulates" with "particulates"

Column 10, line 56, replace "particulates will fit" with "particulates fit"

Column 10, line 58-59, replace "particulates will fit" with "particulates fit"

Column 11, line 50, replace "articulates" with "particulates"

Column 11, line 54, replace "modality mode" with "mode"

Signed and Sealed this

Twenty-third Day of June, 2009

JOHN DOLL
*Acting Director of the United States Patent and Trademark Office*